United States Patent [19]

Lindberg

[11] Patent Number: 4,465,095

[45] Date of Patent: Aug. 14, 1984

[54] PRESSURE-OPERATED FLOW CONTROL VALVE AND MOLDING METHOD

[75] Inventor: John E. Lindberg, Point Richmond, Calif.

[73] Assignee: Owen, Wickersham & Erickson, San Francisco, Calif.

[21] Appl. No.: 348,700

[22] Filed: Feb. 16, 1982

[51] Int. Cl.³ ............................................. F16K 15/00
[52] U.S. Cl. ............................ 137/614.2; 137/516.25; 137/528; 137/556; 123/25 L
[58] Field of Search ................ 137/556, DIG. 2, 522, 137/523, 524, 614.2, 516.25, 528; 251/351, 65; 123/574, 25 L

[56] References Cited

U.S. PATENT DOCUMENTS

| 1,611,611 | 12/1926 | Russell | 251/351 |
|---|---|---|---|
| 2,204,340 | 6/1940 | Bradshaw | 137/614.2 |
| 2,597,952 | 5/1952 | Rosenlund | 251/65 |
| 3,076,417 | 2/1963 | Rhodes et al. | 137/528 |
| 3,143,125 | 8/1964 | Stelzer | 251/65 |
| 4,104,004 | 8/1978 | Graef | 137/516.25 |
| 4,210,174 | 7/1980 | Eross | 251/65 |
| 4,270,508 | 6/1981 | Lindberg | 123/574 |
| 4,331,177 | 5/1982 | Makishima | 137/556 |

FOREIGN PATENT DOCUMENTS 1265214 5/1961 France .............................. 137/614.2

Primary Examiner—A. Michael Chambers
Attorney, Agent, or Firm—Owen, Wickersham & Erickson

[57] ABSTRACT

A pressure-actuated flow control valve. A valve housing has an inlet and an outlet with first and second spaced-apart seats between them and a permanent magnet on the inlet side of the first seat, which is closed to the inlet. A ferromagnetic ball in between the seats is urged by said magnet toward the first seat to check backflow. The valve responds to pressure differential to move the ball away from the first seat and toward the second seat. Between the seats, the passage widens toward the second seat. There may be a needle valve on the outlet side of the valve enabling controlling the flow therethrough.

42 Claims, 22 Drawing Figures

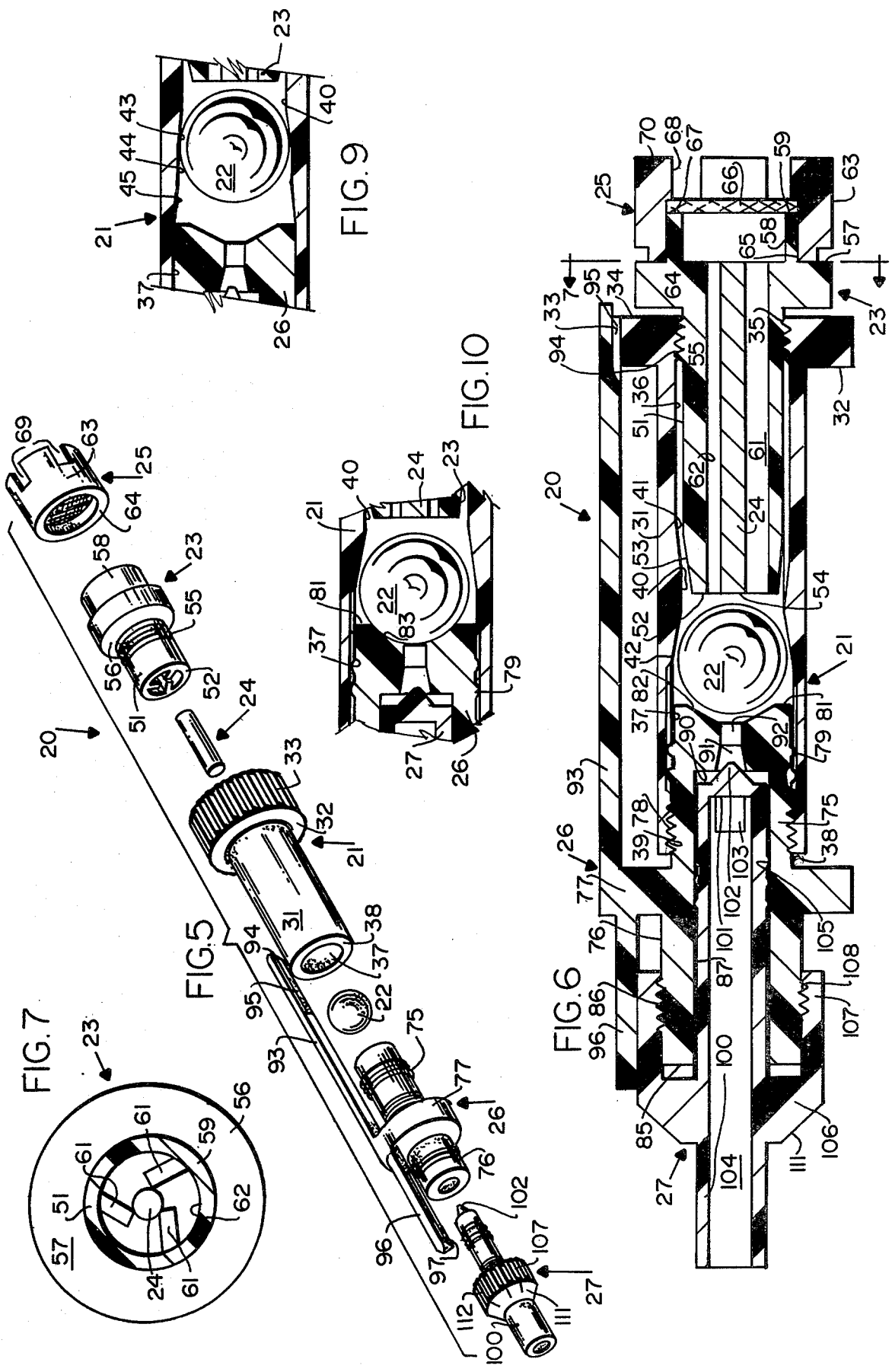

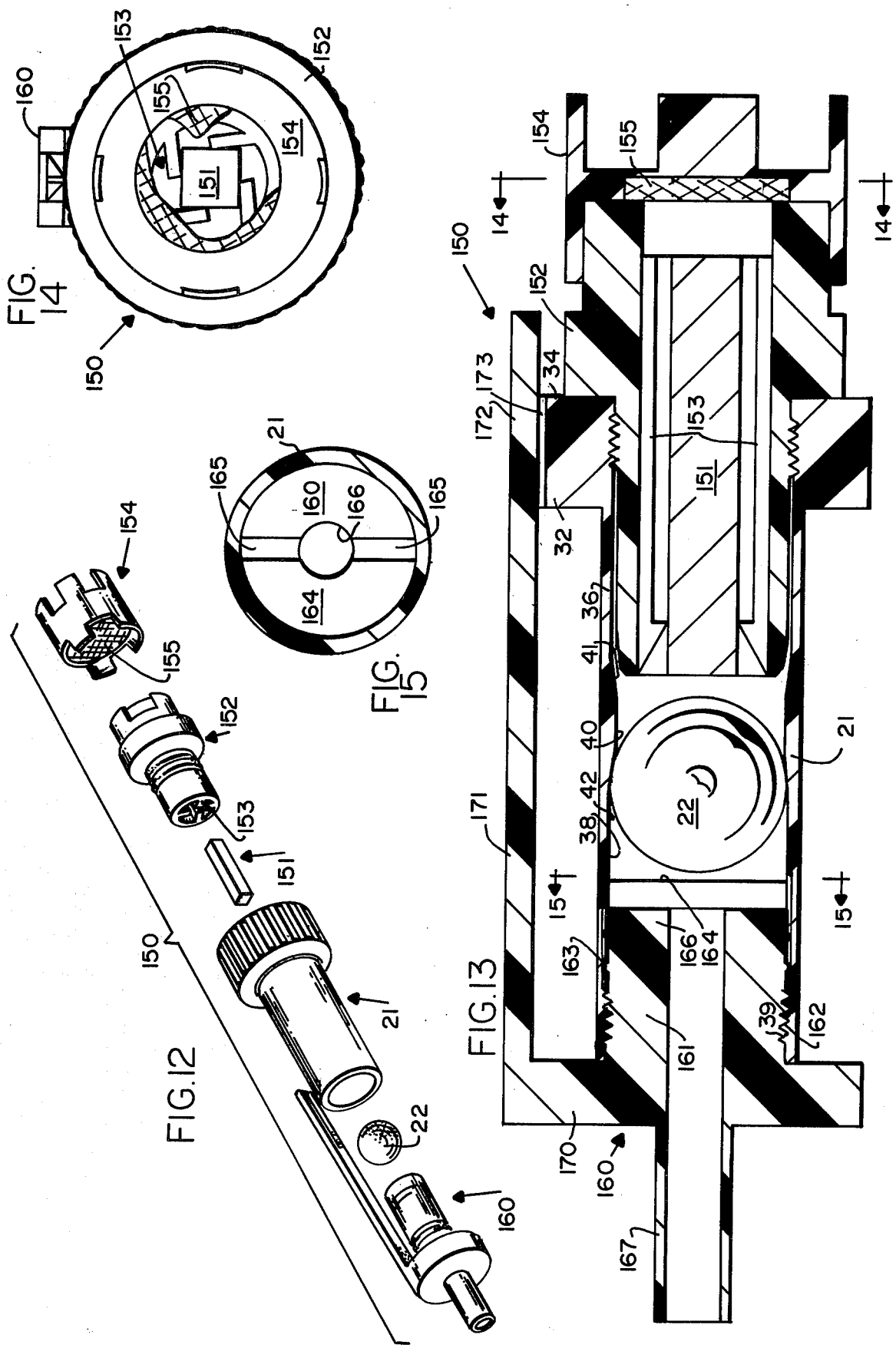

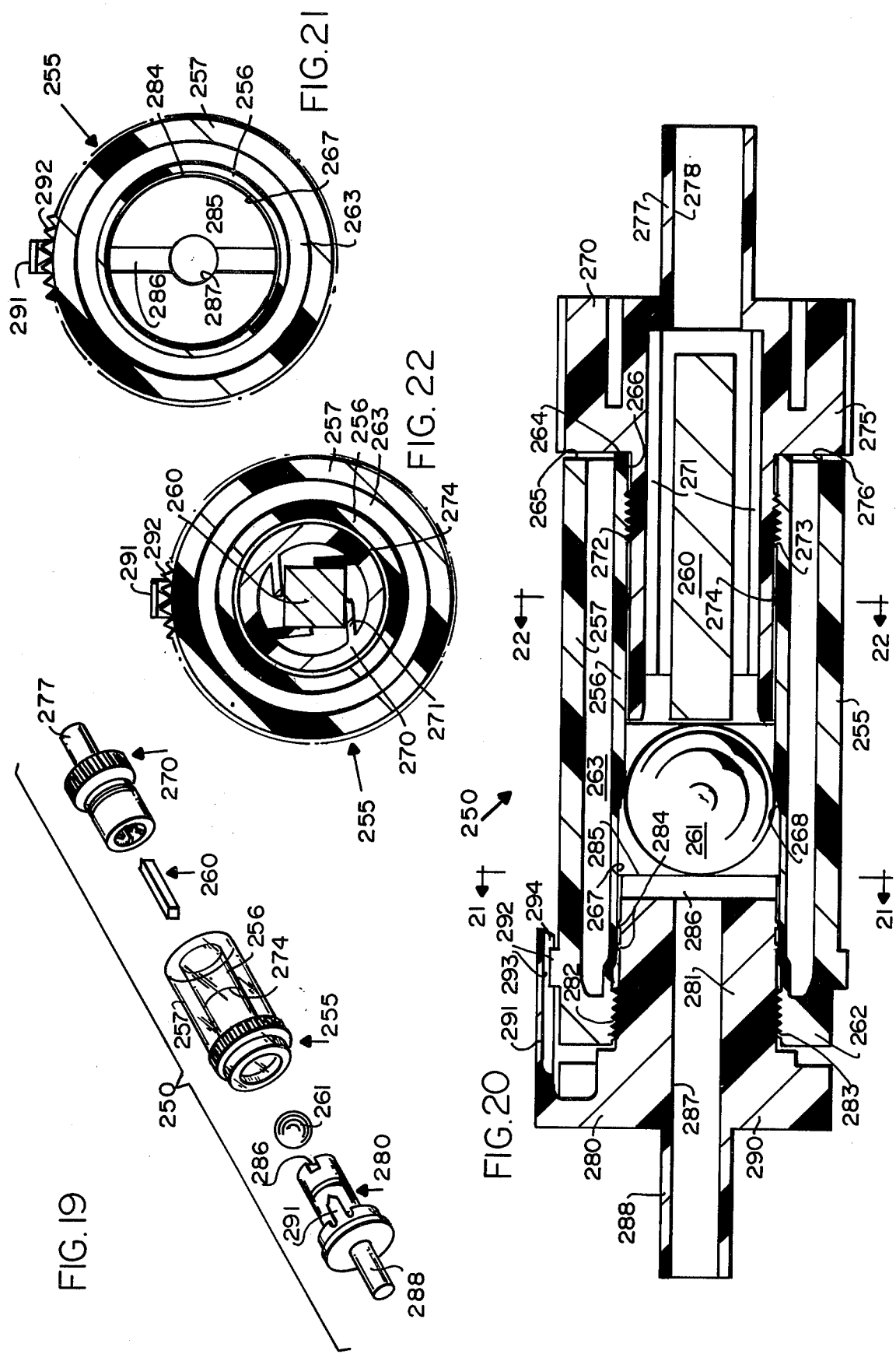

PRESSURE-OPERATED FLOW CONTROL VALVE AND MOLDING METHOD

This invention relates to a flow control valve actuated by pressure differences and which has four basic functions:

(1) it serves as a check valve when the pressure difference is below a certain value, e.g., when a suction force is withdrawn, (2) it serves as a flow control valve when there is a significant pressure difference, e.g., when suction is applied to the valve's outlet end to draw fluid in from an inlet and send it out through the outlet, (3) it has what may be called a "top-end flow control mechanism" to regulate the flow in an additional manner when the input-output pressure differential is high. In one form of the invention it reduces the flow with increasing pressure differential after a certain pressure differential is reached. In another form of the invention it holds the flow at a certain rate or lets it increase at a slow rate after that certain pressure differential is reached.

(4) it serves as a thermal shut-off valve, when used with an internal combustion engine.

The invention also relates to an improved method for molding plastic such as polypropylene to provide parts with consistent density, thickness and roundness of the part.

BACKGROUND OF THE INVENTION

The valve of this invention is applicable to the flow of fluids, whether they be gases or liquids, and it has many applications.

One such application is a valve through which water is taken up from the bottom of a reservoir or from some other source of water and is used in a combustion control system such as that described in my U.S. Pat. No. 4,270,508 issued June 2, 1981. In that invention the total pressure in the exhaust system of an internal combustion engine is employed, among other things, to create suction to draw in water from a water reservoir at a rate depending on the exhaust manifold static plus velocity head near one cylinder to aid in obtaining better combustion of the fuel in the engine. The conduit leading from the water reservoir may be several inches long, often several feet long, and may extend well above the water reservoir. It is highly desirable in such an instance to maintain water in that conduit, so that water is drawn from it as soon as the device control pressure increases above a certain threshold value. Otherwise, the lapse of time before water would be provided to the engine combustion system would result in delayed response while extra dry air would be sucked in, giving quite different combustion performance.

The present invention, as applied to this combustion control system, may be used with an intake near the lowest end of the conduit, inside the water reservoir and at the bottom of that reservoir. The invention provides a valve either inside or outside the reservoir. It enables the flow of water from the reservoir (or other source of water) into the combustion system, and in its check-valve function it assures that water is always retained in the conduit leading from the reservoir, including the times when the engine is not running and when the intake manifold pressure is above a threshold level, so that the water is available for immediate supply to the induction system of the engine when the engine demands it.

It is also desirable to control the flow of water into the combustion control system, increasing that flow in accordance with increasing pressure differential, i.e., with the changes in the device control pressure, at least up to a certain point. The valve of this invention enables that to be done also.

Another feature of the system shown in U.S. Pat. No. 4,270,508 is the desirability of reducing the flow of water into the engine induction system when the pressure differential rises above a predetermined amount. The valve of this invention enables that to be done also. Alternatively, the valve can hold the flow at a constant rate above a predetermined pressure differential, or it can let flow increase at a much slower rate.

In U.S. Pat. No. 4,270,508, the water ejector is sized to match the cubic-inch displacement and power of the engine. The apparatus shown there is not able to satisfy fully the flow requirement at full throttle and still supply the flow needed at a part-throttle steady state and also the flow rate and flow rate changes during acceleration from part-throttle to full throttle. The valve of the present invention solves this problem.

As stated above, the valve is not limited to use in a combustion control system, but such a system is an example of one important use.

When a valve of the type of this invention is used under the hood of a car, it is subject to rising and falling temperatures associated with the driving and parking of the car. This creates a heat-soak problem. When the car is warm and the valve is also warm, it functions as a check valve and flow control device, as previously mentioned. Plastics such as polypropylene that may be used to mold the valve's body have a higher coefficient of expansion than does stainless steel, which may be used in a ball and in a ball-valve embodiment of the invention. As a result, when the car engine is turned off, and the valve assumes its check valve function, the metal ball is urged towards its plastic sealing seat, which is then enlarged due to its expansion by heat. As the car engine and the valve cool, there is a relatively large contraction of the plastic body, while the ball is held in place. This tends to cause the ball to become stuck, so that the valve remains sealed until it is again reheated and the plastic body again expands out from the ball. This action has some desirable features, but it also has undesirable features. One purpose of the present invention is to overcome the undesirable features while retaining the desirable ones.

Another feature of the invention is the novel method by which certain elements of the invention are manufactured. These elements are molded from certain types of plastics. It is highly desirable, and usually necessary, for certain cylindrical elements of the valve to have a uniform wall thickness. Earlier systems were unable to provide uniform flow under these conditions. This has been difficult to insure in most molding processes for these plastics, because the materials are typically sent into the mold in such a manner that they tend to be a little thinner on one side of the cylindrical element than on the other, so that the inner periphery is out-of-round. The present invention enables the production of a uniform part and of a cylindrical wall of uniform thickness by providing a novel method for throttling the flow of plastic into the part, so that the plastic is forced into the part at a uniform rate rather than flowing in to some portions preferentially. As a result, the invention obtains a uniform packing or filling of the mold and therefore a uniformly round part.

OBJECTS OF THE INVENTION

One object of the invention is to provide an improved check valve which during operation also can serve to control flow of fluid passing through the valve by holding either a uniform or decreased flow resistance.

Another object of the invention is to provide a valve in which pressure differential opens the valve and in which the degree of opening depends upon the amount of pressure differential, and yet when a certain predetermined pressure differential is achieved, a change is made, to provide either a throttling with reduction of flow, or leveling off of the flow, or a slower rate of flow increase with further increase in pressure differential.

Another object of the invention is to provide a novel valve employing a permanent magnet in combination with a ferromagnetic ball that is urged by the magnet to a checking position except when the valve is opened by application of a predetermined pressure differential between the inlet of the valve and its outlet.

Another object of the invention is to provide a valve that includes a thermal shut-off feature and also solves the problems resulting from heat soak.

Another object of the invention is to provide an improved method for manufacture of plastic members having cylindrical portions that are truly round and of uniform thickness all around the cylinder.

SUMMARY OF THE INVENTION

The invention comprises a pressure-operated flow control valve having a housing with an inlet and an outlet and first and second spaced-apart seats. On the inlet side of the valve is a permanent magnet which attracts a ferromagnetic ball that is positioned in between the two seats and is urged by the magnet toward the first seat in order to check back flow. On the outlet side of the valve is a flow-control valve for controlling the flow rate when there is flow, the valve responding to pressure differential between the inlet and outlet, for example, to suction exerted at the outlet side of the valve and acting through the flow control valve to move the ball away from its first seat and toward the second seat. A very large pressure differential moves the ball toward or against the second seat and throttles the flow, reducing it, holding it constant, or letting it increase but much more slowly with increasing pressure differential, according to the desired use.

One form of valve of this invention has a generally cylindrical tubular body with a radially outwardly extending flange at a first end of the body. This flange is externally knurled and internally threaded. A second end of the valve is internally threaded, and a central passage extends through the body from end to end, having a first cylindrical portion leading in from the internal threads of the flange, this first cylindrical portion preferably being greater in diameter than the inner diameter of the flange. A similar second cylindrical portion leads in from the second end of the body, and there is a reduced-diameter third cylindrical portion in between the first and second cylindrical portions. A first frustoconical portion of the passage connects the first and third cylindrical portions, while a second frustoconical portion connects the second and third conical portions.

A generally cylindrical tubular magnet holder holds an elongated rod-type permanent magnet in its hollow interior and holds it in such a way as to enable fluid flow at all times around the magnet and into the inlet end of the body passage. The magnet holder has a cylindrical exterior portion that is sufficiently smaller in diameter than the first cylindrical portion of the body to fit therein, preferably with substantial clearance. This cylindrical exterior portion of the magnet holder lies between a frustoconical end portion at a first end of the magnet holder and an exteriorly threaded portion that engages the interior threads of the flange of the body. An outwardly extending flange of the holder lies beyond the exteriorly threaded portion and is succeeded by a cylindrical second end portion having a flat end against which a screen-providing member is abutted. The holder and the screen may be molded as a single piece. The screen can also be replaced by a filter or screen completely separate and remote from the valve.

A valve passage and seat for the ball are located at the opposite end of the body from the magnet and magnet holder. This passage and the seat are provided by a seat member having a first generally cylindrical exterior wall with an exteriorly threaded portion engaging the internal threads of the second end of the body, and it has a cylindrical wall extending into the body having means sealing against the second cylindrical wall portion of the body, so that there is no leakage of the fluid between the body and the seat member, which terminates in the seat.

In the body, between the seat at the end of the seat member and third cylindrical portion of the body is a ferromagnetic ball, which is movable between the seat in one direction and against the second frustoconical portion of the body in the other direction, due to the pull of the magnet. Through the seat of the seat member is an outlet passage.

In this first form of the invention, the seat member has a hollow cylindrical bore leading from the outlet passage directly to the outlet from the whole valve assembly.

In another form of the invention, the seat member provides, as the outlet passage, a cylindrical passage followed by a frustoconical passage forming part of a needle-valve seat. In this form of the invention, the end of the seat member which is at the opposite end from its seat has a second exteriorly threaded, generally cylindrical exterior wall that is spaced axially from the exterior threads of the first exterior wall. A smooth cylindrical bore leads in from the opposite end to a shoulder forming part of the needle valve seat and through which the frustoconical passage and the narrow cylindrical passage lead to the ball seat.

In this form of the invention there is also a generally tubular needle member having a generally cylindrical exterior which fits into the smooth bore of the seat member, suitable sealing means preventing leakage between them. The needle member has a needle at its end facing the frustoconical passage. The needle member has radial passage means adjacent its needle end, leading through its wall into a cylindrical bore. The opposite end of the needle member is then the outlet from the valve, and to it may be secured a suitable conduit. The needle member also has a flange intermediate its ends, leading outwardly to a cylindrical portion with interior threads. These threads engage the second exteriorly threaded portion of the needle seat member for longitudinal axial adjustment of the needle valve relative to the seat member, thereby restricting or widening the clearance between the needle and the frustoconical passage.

Similarly, the seat member has a flange in between its two cylindrical exterior portions, extending out to a long finger extending parallel to the axis of the valve and ending at just beyond the flange of the body. A rib-like member engages in the knurls on the flange and makes a click when the seat member is rotated relatively to the body to move the ball seat further into or out from the body. These clicks can be counted to enable one to know precisely how much adjustment he is making between these parts.

In the needle-valve form of the invention, the needle valve has a cap with a knurled exterior, and the seat member has another finger with a rib engaging the knurls in the cap, to enable control of adjustment between a needle valve member and the seat member. There may also be visual indication on the cap.

As a result of the structure of this valve, when suction is applied to the outer end of the needle member (i.e., when differential pressure is applied), fluid can enter the valve at its inlet through the screen and flow through the magnet holder around the magnet, and depending upon the position of the ball, flow around the ball into the outlet passage. The ball is urged by the magnet into a check valve position when the suction pressure is stopped, and the ball then rests against the second frustoconical portion of the body. When suction is applied, the ball moves within that second frustoconical portion so that the passage around the ball gradually widens and flow is increased, being controlled by the needle valve. However, when the suction is very strong, the ball is urged against the ball seat or so close to it that fluid flow is reduced, leveled off, or held to smaller subsequent increase when the suction is even higher. In that position, the ball tends to oscillate, for when it seats against its seat, it cuts off the flow entirely and in that position the suction cannot hold it; it tends, therefore, to move toward the magnet. But movement away from the ball seat reinstitutes the suction and flow forces, pulling it back toward its seat, and so on.

In another form of the invention, especially useful in solving the hot-soak problem, the valve body may comprise inner and outer tubes, joined at one end but otherwise spaced apart radially from each other. The fluid passes through the inner tube, which may have only one frustoconical or tapered ball seat between two cylindrical bores. Other features of this form of the invention will appear later.

Other objects and advantages of the invention will appear from the following description of a preferred embodiment.

BRIEF DESCRIPTION OF THE DRAWINGS

FIG. 5 is an exploded isometric view of the valve of FIGS. 1-4 showing its different elements, drawn on a smaller scale than FIGS. 1-4.

FIG. 6 is a view in longitudinal section, taken along the line 6—6 in FIG. 1.

FIG. 7 is a view in cross section taken along the line 7—7 in FIG. 6.

FIG. 9 is a fragmentary enlarged view in section of a portion of FIG. 6 modified to show an alternative interior shape of a portion of the valve body.

FIG. 10 is a fragmentary view in section of a portion of FIG. 6 showing a modified form of ball seat.

FIG. 12 is an exploded isometric view of a modified form of valve also embodying the principles of the invention.

FIG. 13 is a view in longitudinal section of the valve of FIG. 12, on an enlarged scale.

FIG. 14 is a view in section taken along the line 14—14 in FIG. 13.

FIG. 15 is a view in section taken along the line 15—15 in FIG. 13.

FIG. 19 is an exploded isometric view of another modified form of valve of the invention, particularly applicable to the heat-soak problem.

FIG. 20 is an enlarged longitudinal section of the assembled valve of FIG. 19.

FIG. 21 is a view in section taken along the line 21—21 in FIG. 20.

FIG. 22 is a view in section taken along the line 22—22 in FIG. 20.

DESCRIPTION OF PREFERRED EMBODIMENTS

Figure 1:
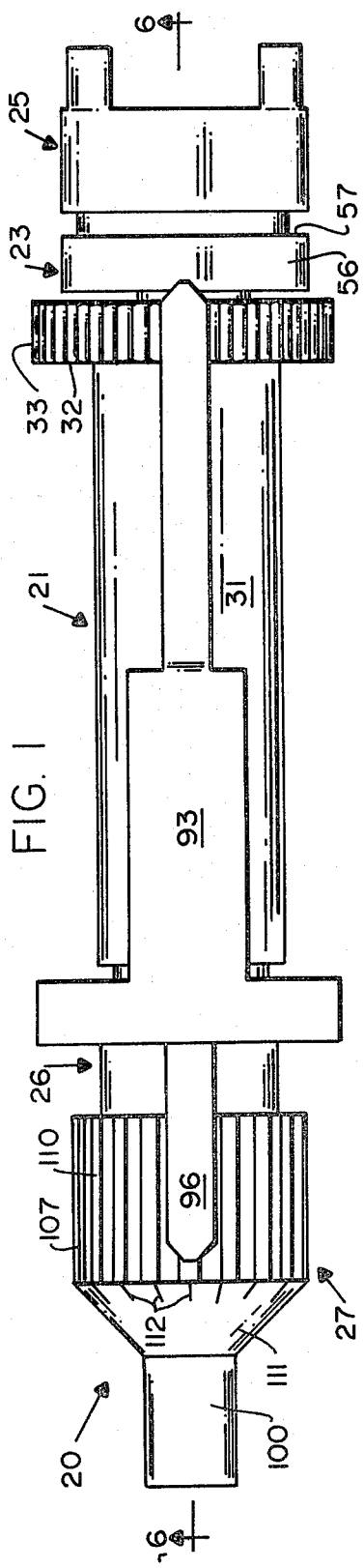
FIG. 1 is a view in side elevation of one form of valve embodying the principles of the invention.
Figure 2:
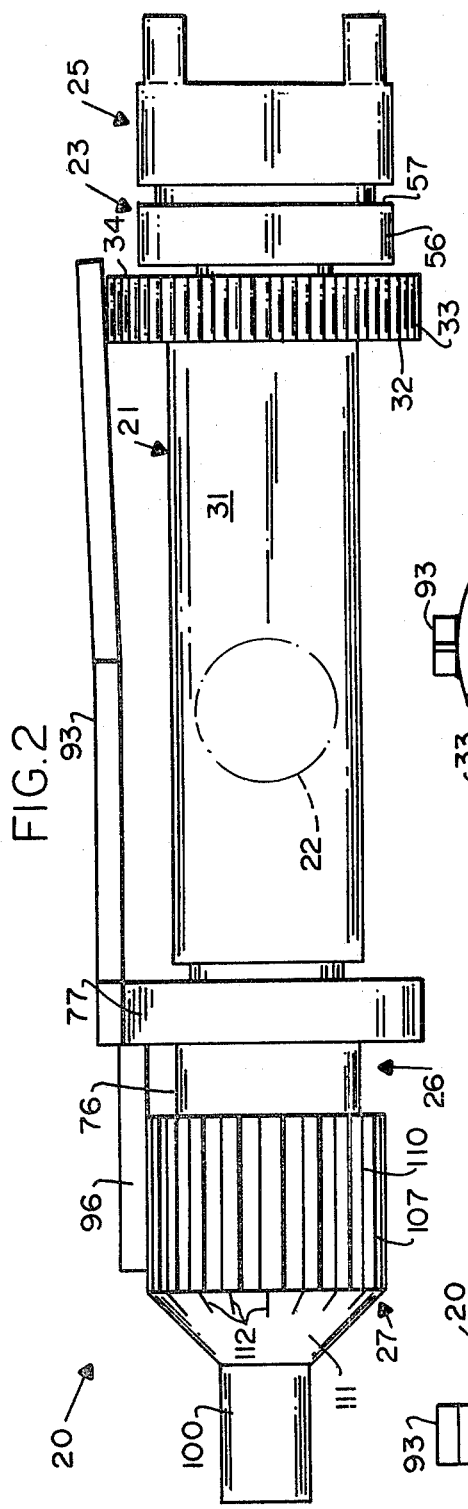
FIG. 2 is another view in side elevation with the valve of FIG. 1 rotated through 90°.
Figure 3:
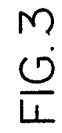
FIG. 3 is a view in end elevation of the inlet end of the valve of FIGS. 1 and 2.
Figure 4:
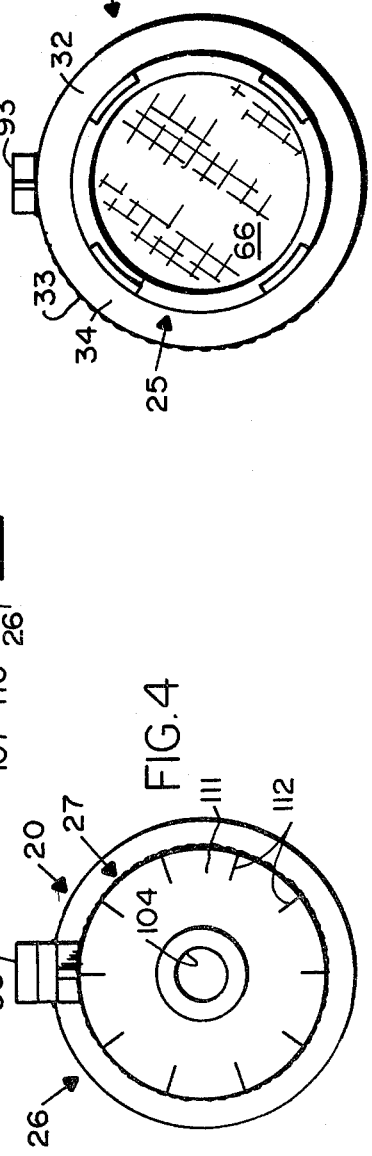
FIG. 4 is a view in end elevation of the outlet end of the valve of FIGS. 1-3.

The drawings show some preferred embodiments of a valve of this invention.

THE VALVE 20 OF FIGS. 1-10

As can be seen in the exploded view, FIG. 5, a valve 20 may comprise a series of assembled parts. The valve 20 has a body 21 inside which is a ferromagnetic ball 22, preferably of stainless steel such as 440C to avoid corrosion. At one end is a magnet holder 23 with its rod magnet 24 and its end closed by a screen and inlet member 25. At the other end of the body 21 are a seat member 26 and a needle member 27.

Turning especially to the sectional view, FIG. 6 (as well as FIGS. 1 to 5 to some extent), it will be seen that the body member 21 is generally cylindrical in shape and is tubular. The body 21 has a long generally cylindrical portion 31 with a radially outwardly extending flange 32 at one end. The flange 32 has a generally cylindrical knurled outer surface 33, an end wall 34, and an interiorly threaded inner surface 35.

The hollow interior of the body 21 generally comprises three cylindrical portions and two frustoconical portions. Thus, a first smooth cylindrical interior wall 36 leads from the flange 32, while a second smooth cylindrical interior wall 37 leads in from the body's opposite end 38 and is provided with interior threads 39. A third cylindrical interior wall 40 lies in between the walls 36 and 37 and is smaller in diameter. It may be joined to the first cylindrical interior wall 36 by a first frustoconical inner wall 41 and may be joined to a second cylindrical interior wall 37 by a second frustoconical wall 42, which serves as one seat for the ball 22.

In a modified, sometimes preferred form of the invention, the shape and structure shown in FIG. 9 is substituted for the frustoconical wall 42. Here, in between the cylindrical walls 37 and 40, there are a frustoconical portion 43 next to the wall 40 and serving as a seat for the ball 22, followed by a short cylindrical wall portion 44 and another frustoconical portion 45. The cylindrical wall portion 44 aids in the responsiveness of the ball 22.

I have found that optimum results at the seats 42 or 43 and 45 can be obtained by having the frustoconical portions 42 or 43 and 45 provide an included angle of 14°.

The body 21 is made of a somewhat rigid material which is not ferromagnetic. A preferable material is nucleated polypropylene. An improved process of manufacture for this body is described later on in this application.

Figure 11:
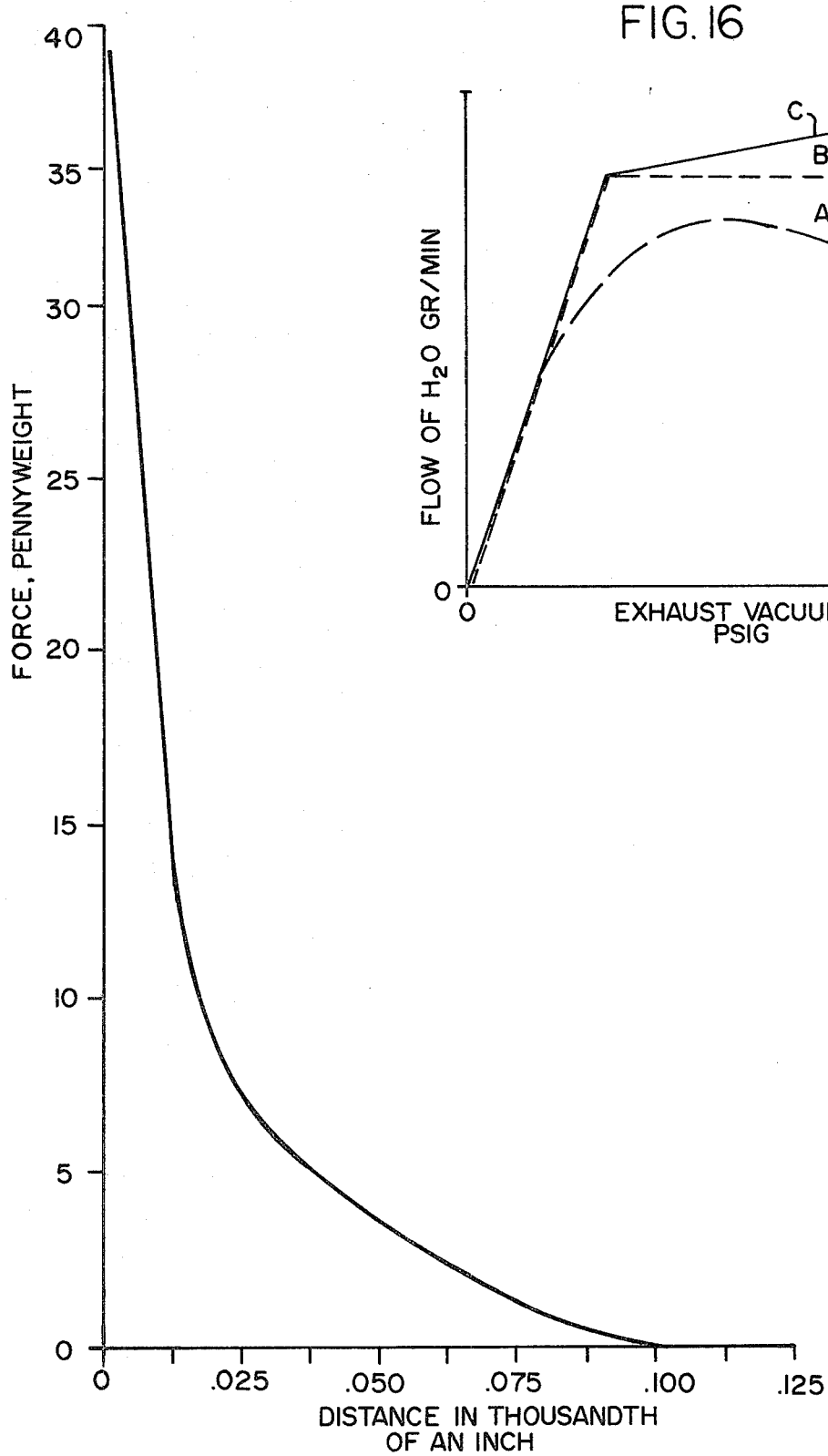
FIG. 11 is a graph plotting force versus distance for a magnet of the type useful in the invention.

The magnet 24 may be a long narrow cylindrical rod. It may be an iron-chromium alloy such as Indalloy ® of Indiana General Magnet Products. Preferably it is coated with a corrosion-resistant coating. Being long and narrow in diameter with the poles adjacent each end, there is a sharp distinction between its response and the distance involved, as is shown in FIG. 11.

The magnet 24 is held co-axially with the body 21 by its holder 23. This holder 23 is preferably made of non-ferromagnetic material which is more rigid than the body 21, preferably of an acetal copolymer resin, such as Celcon of Celanese Plastics. The holder 23 has a generally cylindrical main exterior wall 51 joined to the end 52 closest to the ball 22 by a frustoconical exterior wall 53. One end 54 of the magnet 24 is flush with the end wall 52. The opposite end of the cylindrical wall 51 has an exteriorly threaded portion 55 engaging the interior threads 35 of the flange 32, for adjustment of the axial position of the holder 23 and therefore of the magnet 24 relative to the body 21. Beyond this threaded portion 55, the magnet holder 23 has a flange 56 with a radial wall 57, and the holder 23 terminates in a wider diameter cylindrical portion 58 with an end wall 59, against which the screen and inlet member 25 is seated.

As can be best seen in FIG. 7, three vanes 61 project inwardly inside the holder 23. They project at an angle, rather than truly radially, from an otherwise cylindrical interior wall 62 of the magnet holder 23 and act to hold the magnet 24 accurately in position along the cylindrical axis of the holder 23. These vanes 61 may be rectangular in cross-section.

The screen and inlet member 25 may be made from polyethylene, or polypropylene. The member 25 may be generally cylindrical and can be press fit onto the cylindrical end portion 58 of the magnet holder 23. The member 25 preferably has a generally cylindrical exterior wall 63 with an end 64 abutting the wall 57, and its interior wall is stepped, with a larger diameter bore portion 65 fitting snugly around the cylindrical portion 58 of the magnet holder 23, its end 64 snug up against the wall 57 of the flange 56. The screen or filter 66 abuts a shoulder 67, and there is an inlet bore 68. The cylindrical wall 63 is provided with inlet slots 69 so that its interrupted end wall 70 cannot close off the inlet to the valve 20 by coming against reservoir walls or the like. Thus, liquid or gas flows into the valve 20 through the screen 66 and on around the magnet 24 toward the ball 22. If desired, the member 25 and the screen 66 can be molded as a single element.

At the opposite end of the body 21 from the magnet 24 is the generally cylindrical seat member 26, preferably made of acetal co-polymer like the holder 23. The seat member 26 may have two different cylindrical portions 75 and 76 between which is a flange 77. A first cylindrical portion 75 nearer the ball 22 is preferably provided with exterior threads 78 that engage the interior threads 39 of the body 21 and is also provided with a pair of sealing ribs 79 which effect a seal with the smooth bore of the body's second cylindrical interior wall 37, to prevent the liquid or gas with which the valve 20 is being used from passing out between the body 21 and the seat member 26.

At the inner end of the member 26, a radial end wall 81 leads to a seat 82 for the ball 22. In FIG. 6 the seat 82 is frustoconical, while in FIG. 10 a spherical-segment seat 83 is shown. Other shapes may be used, if desired.

At the opposite end 85 of the seat member 26 is the second cylindrical portion 76 having exterior threads 86 and a smooth cylindrical bore 87. The bore 87 ends at the radial shoulder 90. Between the shoulder 90 and the seat 82 is a fluid passage having a frustoconical portion 91 meeting the shoulder 90 and a smaller diameter cylindrical portion 92 meeting the seat 82.

From the flange 77, a long fingerlike member 93 extends to the flange 32 of the body 21. At its end, the member 93 is preferably provided with a recess 94 embracing the radially outer portion of the flange 32 and having a rib 95. The recess 94 fits over the knurled portion 33 of the flange 32 and the rib 95 engages the knurls, so that when the seat member 26 is rotated relatively to the body 21, by screwing in or out the threads 78 in the threads 39, one can feel or hear the degree of turn relative to the knurls 33 on the flange 32, so that one can judge exactly how far he is screwing in or out the member 26 in the body 21. For example, there may be eighty threads per inch in the threads 39 and 78, and there may be fifty knurls 33. By counting clocks one knows exactly how far the member 26 is moved relative to the body 21.

Another finger 96 extends from the flange 77 in the opposite direction from the finger 93. It, too, has an inwardly facing rib 97.

the needle valve member 27, which may be made from polypropylene, is a generally cylindrical tube 100 with a closed end 101 providing a needle-like member 102. The needle 102 may be shaped as a cone or generally like a cone with a rounded vertex, as shown. The needle 102 faces and partly enters into the frustoconical passage 91. Through the cylindrical wall near the closed end 101 is a passage 103 or pair of passages 103 leading from the clearance between the tube 100 and the bore 87 radially into a hollow cylindrical bore 104, which may be completely smooth. The exterior wall preferably is smooth except for a series of ridges or ribs 105 that provide a seal with the bore 87 so that the fluid cannot flow between the needle valve member 27 and the seat member 26 at this point.

The needle valve member 27 also has a flange 106 which leads out to a generally cylindrical cap portion 107 having interior threads 108 that are threaded to the exterior threads 86 of the member 27 and enable close adjustment of the needle valve 102 relative to the passage 91 for setting the flow and obtaining the control thereof. The cap 107 is provided with external knurls 110 that are engaged by the rib 97 of the finger 96 to indicate by clicks just how much relative movement between the members 26 and 27 takes place on relative rotation. In addition, a frustoconical end wall 111 of the cap 107 is provided with calibrations 112 that can be observed visually.

Figure 8:
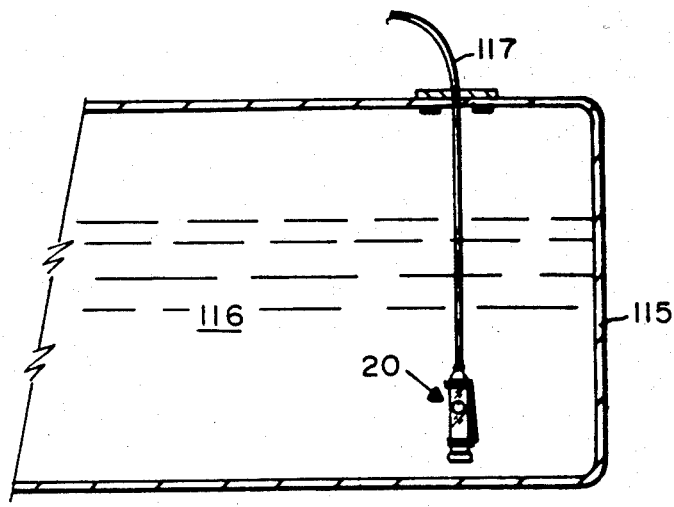
FIG. 8 is a view partially in section of a water reservoir with a valve like that of FIGS. 1-7.
Figure 17:
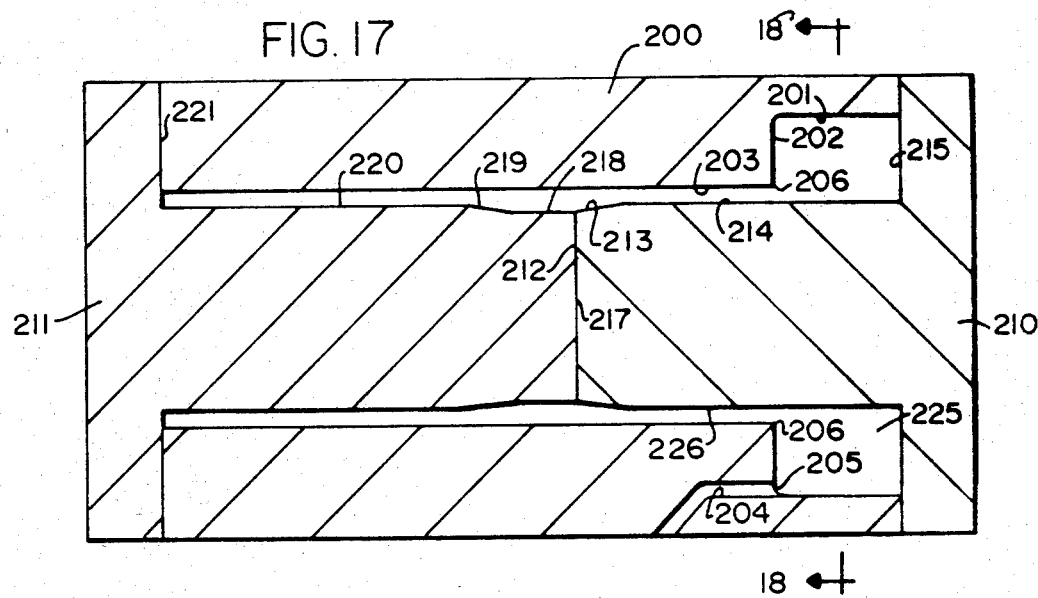
FIG. 17 is a view in longitudinal section of a mold illustrating the process of making the body member of the valve.
Figure 18:
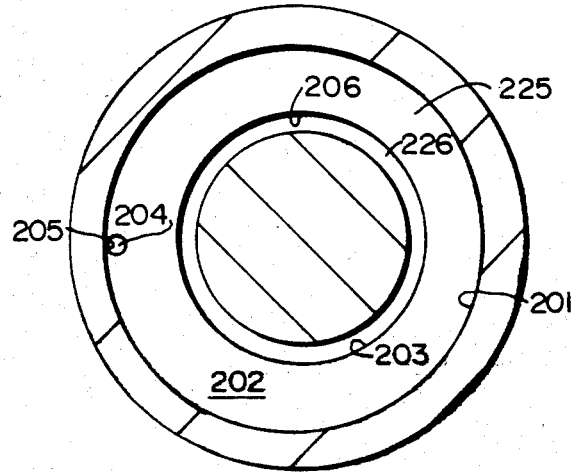
FIG. 18 is a view in section taken along the line 18—18 in FIG. 17.

In operation, the valve may be immersed in fluid inside a reservoir 115 containing water 116 (see FIG. 8). A conduit 117 may be attached to the needle valve tube 100 and may lead up several inches or a foot or more to some other device, such as the combustion control device of U.S. Pat. No. 4,270,508. The ball 22 serves normally as a check valve pulled by the magnet 24 to come against a circle forming part of the frustoconical surface 42 or 43 inside the body 21. With the ball 22 in this position, no flow takes place, and any water or other liquid which has been taken up into the conduit 117 is retained where it was when the ball 22 was seated in this position, closely available for immediate use. The amount of suction necessary to unseat the ball 22 from this position can be varied by adjusting the position of the magnet holder 23 relative to the body 21. When the magnet 24 is placed into the holder 23, its end 54 is given a flat or flush set at the end 52, so that by turning the magnetic holder 23 relative to the flange 32, the magnet 22 can be moved closer to or further away from the ball 22, thereby increasing or decreasing the force holding the ball 22 in place against the wall 42 or 43. See FIG. 1.

At the other end of the valve 20, suction may be exerted on the conduit 117 to pull the ball 22 away from the wall 42 or 43. Flow increases as the ball leaves the wall 42 or 43, since the wall around the ball gets longer and larger. Flow can be regulated by the position of the needle 102 relative to the passage 91 obtained, by adjusting the needle threads 108 relative to the threads 86 of the needle seat member 27. Also, the distance the ball 22 must move between the seat 42 or 43 and the seat 82 is adjusted by adjusting the position of the needle seat member 27 relative to the body 21 by rotating the member 27 so that its threads 78 move relative to the threads 39 of the body 21, and an indication of how much movement has been obtained is felt or heard as a result of the clicks caused between the knurls 33 and the rib 95 on the finger 93.

Figure 16:
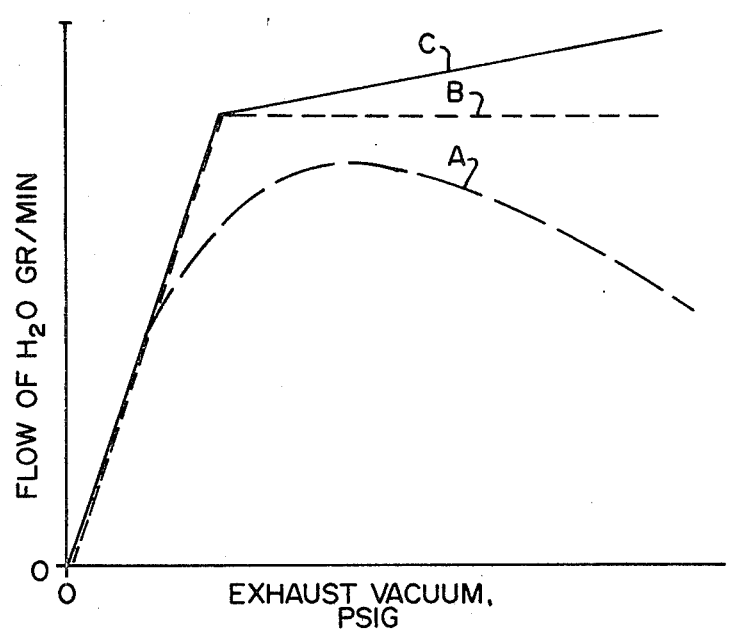
FIG. 16 is a diagram illustrating flow through the valve between a threshold and a top end, according to the pressure differential involved and differing, according to different valve structures.

Top end control occurs when the suction (or pressure differential) reaches a point where the ball 22 is close to the seat 82. This is shown diagrammatically by a curve A in FIG. 16. The curve is substantially linear from its threshold to a turning point, where the curve actually turns over, and less water is supplied at higher pressure differentials beyond the turning point than at somewhat lower pressure differentials before the turning point.

THE VALVE 150 OF FIGS. 12 TO 15

FIGS. 12 to 15 show a valve 150 which has many similarities to and some differences from the valve 20. The body 21 and ball 22 are shown as identical to the body 21 and ball 22 of the valve 20 and therefore with the same reference numerals. While the valve 150 could use the members 23, 24, and 25 of the valve 20, they are here shown as different. The valve 150 has a magnet 151, which is square in cross section instead of round, and a magnet holder 152 which has four flexing vanes 153 for retaining the magnet 151 instead of the three vanes 61 of the valve 20. Otherwise, the holder 152 is like the holder 24. The screen and inlet member 154 is much like the member 25; it has a screen or filter 155, preferably as an integral part thereof.

The valve 150 has a seat member 160 that is much simpler than the member 26, and it has nothing corresponding to the needle valve member 27. A cylindrical portion 161 of the member 160 has external threads 162 engaging the threads 39 of the body 21 and has sealing ribs 163 corresponding to the ribs 79. The cylindrical portion ends in a planar annular end wall 164 into which are recessed radial passages 165 and from which a smooth bore 166 leads axially through the member 160, extending beyond the cylindrical portion 161 and into a smooth cylindrical or tubular portion 167.

Between the cylindrical portions 161 and 167 is a cylindrical flange 170, from which a finger 171 leads to the flange 32 of the body. A recessed portion 172 has a rib 173 to engage the knurls 33 for the same reason as before.

The ball 22 seats, as before, against the frustoconical body portion 42 and can move against the end wall 164. The distance from the magnet 151 to the seated ball 22 is regulated as before, and the distance between the ball's two seats is also regulated as before. By changing the position of the seat wall 164 and its shape, it is possible to obtain curves B and C of FIG. 16, in which the top end is completely (or substantially) level (curve B) or in which the top end flow increases (curve C) much more slowly above the predetermined value of applied pressure differential.

As has been previously indicated, the flow through the valve is regulated by the magnet setting and the suction applied, other variables being fixed. A specific such valve was constructed with a nucleated polypropylene body and a sintered ⅛" square by ¾" long Alnico 8 magnet. The magnet was set at 20" water, and the reservoir height was 12 inches above the reactor, which was of the type supplied by Perry Tool and Research having two fluid ejectors: a 0.047"/0.070" and a 0.038"/0.052". The water temperature was 64° F. Compressed air was supplied to a scoop on the reactor. As the air passed through the ejectors, suction was created at the inlet tube, and this suction was transmitted to the valve through an ⅛" I.D. rubber tube. As the suction was increased, the flow of water through the valve increased. On successive tests, the stop in the valve was set at progressively greater distances from the sealing seat, giving the ball greater travel and increased flow, as has been previously noted in the application. The results were as follows:

TABLE A

| | Flow of Water through Valve in milliliters/minute = gm/min $H_2O$ | | | |
|---|---|---|---|---|
| Ball travel: | .006" | .008" | .010" | .012" |
| Pressure on Reactor: | | | | |
| 14" $H_2O$ | 0 | 2 | 2 | 8 |
| 28" $H_2O$ | 0 | 3 | 3 | 10 |
| 42" $H_2O$ | 6 | 8 | 19 | 22 |
| 56" $H_2O$ | 6 | 12 | 24 | 28 |
| 70" $H_2O$ | 7 | 14 | 28 | 32 |
| 84" $H_2O$ | 8 | 16 | 31 | 35 |
| 98" $H_2O$ | 9 | 18 | 33 | 37 |

THE VALVE 250 OF FIGS. 19 TO 22

In the system as previously described, the fluid control valve 20 or 150 was located in the water reservoir 115. This location caused a problem that was noted in several tests, both on the road and in the laboratory. The problem was that when a car was left to cool overnight, no flow of water could be measured through the system on the following morning. Apparently the ball in the valve had become stuck, and the sticking seemed to be due to the temmperature cycle of the water in the reservoir. The reservoir 115, being under the hood of the automobile, its contained water became heated as the car was driven. Since the valve was located in the reservoir and was immersed in the water, it also was heated to the temperature of the water as the car was driven. Also, it was known that the coefficient of expansion of the plastic of which the valve body was molded (polypropylene) is greater (approximately 10X) than the coefficient of expansion of the 440 stainless steel ball in the valve. Thus, it appears that when the automobile engine was turned off, the ball was pulled closer to the magnet than normally, because the conical seat in the plastic body had expanded more than the ball. Moreover, the plastic seat was apparently slightly softened by the heat, so that the ball, under the pull of the magnet, pressed into the seat and approached the magnet more closely than would have been possible if the seat were cold and "firm". Finally, during gradual cooling over the following several hours, the ball was held in palce by the magnet with unusual force, because the ball was in closer proximity with the magnet than it had originally been adjusted for. At the same time, the body apparently contracted more than the ball, and shrunk around the ball, capturing it, and causing the whole assembly to become stuck. Therefore, to become unstuck, the assembly had to be heated, because the body had to expand more than the ball in order to be freed.

As a result of these experiments, a new form of valve 250 was devised, as shown in FIGS. 19–22.

The location of the valve 250 was changed. The valve 250 is not put into a reservoir, because of the relatively high heat encountered there, the slow rate of heat rise there, and because the valve is there insulated from shock and vibration. A weighted filter (no shown) may be used in the reservoir to pick up water at the bottom. A 3/16' rubber tube 251 takes water to the valve 250 where its flow is regulated. A ¼" rubber tube 252 takes water from the valve 250 to the reactor (not shown).

Certain criteria guide the choice of the location where the valve 250 is to be installed. The valve 250 is kept away from large thermal masses; so it is not installed directly above the engine or on the radiator or on the radiator hose. The valve 250 will generally open at 20° to 30° F. below the maximum heat attained during the previous cycle of warmth, so that placing the valve 250 in a relatively cool location allows it to open at a relatively low temperature. The valve 250 should be firmly secured at a location where it will be subjected to the normal bounces and vibrations, which, along with the rising temperature of the plastic body, help to free the ball as the car warms up after cold start. Thus, when the car is first started, after having been heated and completely cooled, the valve 250 is in a "stuck" condition, and there is no water flow. Flow starts when the engine has warmed up.

Although sticking is a problem because of the long time that it can take for the reservoir to warm the valve enough to liberate the ball, the sticking phenomenon was viewed by the inventor as an opportunity. It had been known for some time that engine performance was better when as little water as possible entered the engine at cold start. Therefore, a valve that is stuck and sealed at cold start can be a real advantage. However, if such a stuck-and-sealed valve takes a long time to open, or, worse yet, stays stuck, it is unsatisfactory.

Thus the new and improved outside-the-reservoir valve 250 was developed to take advantage of the desirable, cyclical stuck state at cold start without being stuck too long. In addition to the structure of the valve, described below, four factors tend to lessen the possibility of permanent sticking: (1) The valve 250 is now outside the reservoir and therefore not in a large mass of water which would thermally insulate it from the warming engine. (2) The valve 250 can be placed under the hood (or anywhere else suitable in the car) where the temperature cycle curve has the desirable characteristics of a rapidly rising warm-up curve and a not-too-high maximum temperature. (3) The valve 250 can be located in a position subject to greater shocks and vibrations than would be experienced inside the reservoir. These vibrations tend to help to release a reluctant, stuck ball. (4) The valve is properly located under the engine hood where it will experience rapid temperature rise but is not positioned over the engine and is not attached to the radiator hose or to other points which experience substantial heat soak temperature rise after the engine is turned off (due to large thermal mass and removal of the action of the cooling system); such large temperature rises above the normal operating temperature could expand the valve body so that it would lock up during cold soak and not be easily freed in a normal operating cycle. Locating the valve on the side or front of engine works well.

The structure of the valve 250 is also important. The valve 250 has a body 255 with two coaxial cylindrical tubes 256 and 257. The interior tube 256, in conjunction with a magnet 260 and ball 261, performs the check valve and fluid flow rate control functions described earlier, and may be substantially as shown in the valve 150. The outer tube or sleeve 257 provides three primary improvements. (1) The sleeve 257 dramatically improves the moldability of the body 255, specifically the necessary and difficult-to-achieve exact roundness of the inner cylinder or tube 256. This appears to be partly due to a more uniform distribution of heat in the molten plastic when the part is injection molded, partly due to the physical shielding which the sleeve 257 gives to the inner cylinder 256 when the parts are cooling after ejection from the molding equipment, and partly due to thermal insulation given to the inner cylinder 256 as it cools after molding. (2) The sleeve 257 acts as a thermal insulator to the functional inner cylinder 256 during operation. This moderates shortterm temperature fluctuations that might cause inopportune sticking of the ball 261. (3) The sleeve 257 helps to enable the valve 250 to be mounted in a variety of locations. This is important, because when the valve was suspended in the reservoir, the body was not subjected to physical distortions. When the valve 250 is attached to some rigid structure outside the reservoir, the sleeve 257 absorbs distortions introduced by the installation. The valve 250 is properly supported by securing its inlet and outlet hoses 251 and 252 to appropriate structure.

The tubes 256 and 257 are joined together by a radial portion 262 at the outlet end only. Otherwise, they are spaced apart radially by annular space 263. The open end 264 of the inner tube 256 lies a little beyond the open end 265 of the outer tube 257. The inner tube 256 has a cylindrical inlet bore 266, a larger-diameter cylindrical outlet bore 267, and a frustoconical or tapered portion 268, acting as one seat for the ball 261.

The magnet 260 is in a holder 270 much like the holder 151, having four retaining fins 271, which, preferably, are slightly warped to enhance installation. The holder 270 has threads 272 that go into the bore 266 and form matching threads 273 there. There is also a sealing rib 274. The holder 270 has a radially outwardly extending flange 275 with a radial wall 276 that abuts the open end 264 of the inner tube 256, and there is clearance between the wall 276 and the open end 265 of the outer tube 257 to prevent distation of the inner tube 256. The holder 270 also has an inlet fitting 277 with a bore 278 therethrough.

The valve 250 has a seat member 280 that is much like the member 160. A cylindrical portion 281 has external threads 282 engaging threads 283 of the body 255 and has sealing ribs 284. The cylindrical portion 281 ends in a planar annular end wall 285 into which are recessed radial passages 286 and from which a smooth bore 287 leads axially through the member 280, extending beyond the cylindrical portion 281 and into a smooth cylindrical or tubular portion 288.

A cylindrical flange 290 has an axial finger 291, and the body 255 has a knurled portion 292 on the exterior wall of the outer tube 257. A recessed portion 293 of the finger 291 has a rib 294 to engage the knurls 292 for the same reason as before.

The ball 261 seats, as before, against the frustoconical passage portion 268 and can move against the end wall 285. The distance from the magnet 260 to the seated ball 261 is regulated as before, and the distance between the ball's two seats 268 and 285 is also regulated as before. By changing the position of the seat wall 285 and its shape, it is possible to obtain curves B and C of FIG. 16, in which the top end is completely (or substantially) level (curve B) or in which the top end flow increases (curve C) much more slowly above the predetermined value of applied pressure differential.

During operation, water flows from the reservoir, or other fluid source through the rubber tubing 251 to the inlet fitting or stem 277 of the magnet holder 270. Water flows around the magnet 260 as previously described. The relative position of the ball 260 and the molded seat 268 control fluid flow. The valve 250 is sealed until it is warm. When unstuck, flow is possible only when sufficient suction is applied to the outflow stem 288. The distance that the ball 261 is allowed to travel regulates flow, when flow occurs. The water flows out through the outflow stem 288.

To help assure correct directional orientation of the valve 250 when it is installed, the rubber tubing connections at the two ends of the valve are different sizes. The inflow tube 251 is 3/16" nominal I.D., and the outflow tube 252 is ⅛" nominal I.D.

FLOW-RATE CONTROL

The primary control of flow rate is due to balancing of magnetic and drag forces on the ball. In addition, there is, as stated earlier, "top-end" control, by omission of the needle valve. The flow-rate control by use of magnetic force-drag equilibrium is an important aspect of the invention.

Any time when the ball is off its seat and the pressure differential is greater than a threshold value, fluid will flow though the valve. The rate of fluid flow is regulated by the variable resistance to flow caused by the ball partially obstructing the flow. As the ball moves away from the seat, the magnetic force pulling on it decreases. The absolute amount of magnetic force depends both on the magnet and its proximity to the ball seat. The magnetic force on the ball is less when the magnet has been moved further from the ball and seat than when the magnet is closer to the ball and seat.

When the ball is off the seat and fluid is flowing, the drag on the ball rapidly decreases as the distance between the ball and seat increases. The drag is $$D = C_D \rho \tfrac{1}{2} V^2 S$$

where
 $C_D$ = drag coefficient
 $\rho$ = density of fluid
 $V$ = velocity, and
 $S$ = area.

For a given valve and fluid at a given temperature, $\rho$ and $S$ are constants, so drag is a function of $V^2$ and $C_D$. As the valve opens, the Reynolds Number corresponding to the ball rapidly increases, giving a decreasing and then stable drag coefficient $C_D$. As the ball comes off the seat, the net flow area around the ball rapidly increases. For example: with a 14° included angle cone seat, and a 0.3125" ball, as net flow area increases, velocity of the fluid decreases and $V^2$ drops dramatically. Therefore, with the effects of $C_D$ and $V^2$, the drag drops very rapidly, as the distance between the ball and seat increases, as shown in Table 2 below.

TABLE 2

| Displacement of ball from seat, inches | Net flow area Sq. inches |
|---|---|
| .000 | .00000 |
| .005 | .00060 |
| .010 | .00120 |
| .015 | .00180 |
| .020 | .00240 |
| .025 | .00300 |
| .030 | .00360 |

Now consider the combined effects of magnetic pull and drag on the ball while fluid flows. After the ball moves off the seat, it is observed to float within the cone that forms the seat. As the ball leaves the seat it reaches a point when the drag on the ball exceeds the magnetic pull; so the ball moves in the direction of fluid flow, further from the seat. Should the ball be at a point where the magnetic pull exceeds the drag, the ball is pulled back. The nature of the drag and magnetic forces, assures equilibrium when the forces are in a suitable and intersecting range.

The rate of flow can be regulated as follows: With the fluid flow and the ball floating at equilibrium, the magnetic and drag forces are balanced. By adjusting the magnet relative to the seat, a new equilibrium position for the ball will be established. By moving the magnet away from the seat, the ball will reach equilibrium further from the seat. This gives less resistance to the flow of fluid and increases the flow. By moving the magnet towards the seat, the ball will reach equilibrium closer to the seat. This gives more resistance to flow and decreases the flow. In summary: moving the magnet closer to the seat will decrease flow, moving it away will increase flow.

The manner in which the responsiveness is aided can be seen by reference to Table 2 and FIG. 11. If the interior wall were frustoconical over the full length of travel of the ball, then the drag on the ball would decrease in a continuous manner in accordance with Table 2. The magnetic force on the ball would decrease in accordance with FIG. 11. The net force on the ball is the difference between these two forces and changes in a continuous manner. The introduction of a cylindrical section as in FIG. 9 offers another degree of freedom because during the transit of the ball through this region the flow area remains constant and so, then, does the drag on the ball. The principal merit of this result is that we are now working on a part of the curve in FIG. 11 where the magnetic force is less and thus allows the ball to move further from the frustoconical wall 45, resulting in a higher flow rate at the point of stability of magnetic and flow friction forces, and the rate of change is much slower.

Operation of the needle 27 is a major method of rate of flow control used in the valve 20. Similarly, moving the seat 164 or 285 achieves flow control and is the primary method used in the valves 150 and 250.

THE METHOD OF MOLDING THE BODY FIGS. 17 AND 18)

It is important for the walls of the body 21 to be constant in thickness at each axial point and to be constant in density. Ordinary molding practices tend to result in variable densities and thicknesses, probably because of preferential uneven filling of the mold by the liquid plastic.

Here, an outer annular mold member 200 has a shaped interior providing a large diameter portion 201 and a shoulder 202 (for the flange 32) and a cylindrical portion 203. A mold inlet 204 leads into the mold at a corner 205 where the portions 201 and 202 meet, the inlet lying in line with and approximately tangent to the portion 201, but at 45° thereto, to project the liquid plastic into the mold 200. If desired, there may be a pair of such inlets 204 diametrically opposite each other, for more rapid and uniform filling of the mold. The shoulder 202 meets the cylindrical portion 203 at a sharp right angle corner 206 that is purposely sharp though smoothed off, as by abrasive cloth, to remove burrs, and not rounded, so as to deter or to contract flow of the liquid plastic.

There are two inner mold members or mandrels 210 and 211. The mandrel 210 may be shaped to provide an end wall 212, a frustoconical portion 213, a cylindrical portion 214 and an end closure 215 engaging the member 201. The other mandrel 211 may have an end wall 217 abutting the wall 212, from which a cylindrical portion 218 leads by a frustoconical portion 219 to another cylindrical portion 220 that ends in an end closure wall 221 which abuts the mold member 201.

Between the mold members 201, 210, and 211 is the mold cavity, a thick flange-shaping cavity 225 and a thin gradually cylindrical cavity 226. This latter cavity 226 is exteriorly cylindrical but has short frustoconical interior portions, as defined by the mandrels 210 and 211.

Hot liquid polypropylene (e.g. 400° to 550° F.), preferably nucleated, may be formed at high velocity into the mold cavity 225 through the inlet 204 at about 7500 to 20,000 p.s.i., typically 15,000 to 20,000 p.s.i., traveling toward the end wall 215 and in toward the axis. The sharp corner impedes flow into the cavity 226 and results in a build-up of pressure and velocity of flow at the sharp edge 206, the velocity approaches sonic velocity and the corner 206 acts as a sonic choke. As a result, the plastic flows into the cavity 226 under high pressure and high speed and uniformly around the periphery of the cavity, thereby filling the cavity 226 uniformly, giving, on cooling, uniform wall thickness, uniform density, and a true cylindrical shape. At any point where the plastic might start to flow faster than at other points, the flow is slowed by a tremendous increase in resistance as it approaches closer to the velocity of sound.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

I claim:

1. A pressure-actuated flow control valve comprising:
    a housing with an inlet and an outlet and first and second spaced-apart ball seats in a passage between said inlet and outlet, the first ball seat being closer to said inlet,
    a permanent magnet on the inlet side of said first seat,
    a ferromagnetic ball in between said seats urged by said magnet toward said first seat to check backflow,
    flow control means on the outlet side of said valve for controlling flow therethrough,
    said valve responding to a predetermined pressure differential between the inlet and the outlet to move said ball away from said first seat and toward said second seat,
    said passage widening between said first seat and said second seat.

2. The valve of claim 1 wherein said first seat is frustoconical, widening toward said second seat.

3. The valve of claim 2 wherein said frustoconical seat widens toward a short cylindrical passage, succeeded by a second frustoconical seat widening toward said second seat, which is succeeded by a larger diameter and longer cylindrical passage leading to said second seat.

4. The valve of claim 3 wherein said second seat is also frustoconical.

5. The valve of claim 1 wherein the permanent magnet is a long cylindrical rod.

6. The valve of claim 1 wherein the permanent magnet is a long bar, square in cross-section.

7. The valve of claim 1 wherein said second seat comprises a flat annular end wall around a cylindrical passage and having radial passages recessed into its face.

8. The valve of claim 7 wherein said cylindrical passage is one end of a smooth cylindrical outlet passage.

9. The valve of claim 1 wherein said second seat is annular and frustoconical with a central opening leading therefrom.

10. The valve of either claim 9 wherein said central opening leads via an axial cylindrical passage to an axial frustoconical passage that widens away from the central opening.

11. The valve of claim 10 having an adjustable needle valve facing said frustoconical passage.

12. The valve of claim 11 wherein said needle valve faces an end wall of a member having a cylindrical bore in a cylindrical wall, with passage means adjacent to said end wall through said cylindrical wall into said bore.

13. The valve of claim 1 wherein said second seat is an annular spherical segment with a central opening leading therefrom.

14. A pressure-actuated flow control valve comprising:
- a generally cylindrical housing with an inlet, an outlet, an axial passage between the inlet and the outlet, a first seat in the passage near the inlet, and a second seat in the passage spaced apart from the first seat and nearer the outlet,
- a permanent magnet located axially in said passage, between said inlet and said first seat,
- a ferromagnetic ball in between said seats urged by said magnet toward said first seat to check backflow,
- said second seat controlling flow through the valve,
- said valve responding to pressure differential between the inlet and the outlet to move said ball away from said first seat and toward said second seat,
- the clearance around said ball in said passage increasing toward said second seat.

15. The valve of claim 14 wherein said housing comprises:
- a generally cylindrical non-ferromagnetic tubular body having a central axial passage therethrough with a first cylindrical passage portion leading in from the inlet end of the body, a second cylindrical passage portion leading in from the outlet end of the body, a reduced-diameter third cylindrical passage portion between said first and second cylindrical passage portions, a first frustoconical passage portion connecting said first and third cylindrical portions, and a second frustoconical passage portion connecting said second and third cylindrical portions and serving as said first seat.

16. The valve of claim 15 wherein said magnet is long and narrow.

17. The valve of claim 14, including
- a generally cylindrical seat member adjustably threaded into the outlet end of said body and providing said second seat and having an outlet end with a cylindrical bore leading in therefrom to a shoulder, and an axial needle-valve opening joining said shoulder to said second seat, and
- a hollow needle member having a generally cylindrical exterior fitting in and sealed to said bore of said seat member and threaded to said seat member for varying their relative positions and having a needle end facing said needle-valve opening, said needle member having radial passage means adjacent said needle end leading into a cylindrical bore of said needle member that provides said valve outlet.

18. The valve of claim 17 wherein said needle-valve opening has a frustoconical portion opening at said shoulder and narrowing toward said second seat and a cylindrical portion connecting that frustoconical portion to said second seat.

19. The valve of claim 17 wherein said second seat is an annular spherical segment around said needle valve opening.

20. The valve of claim 14 wherein said housing comprises:
- a generally cylindrical non-ferromagnetic tubular body having a central axial passage therethrough with a first cylindrical pressure portion leading in from the inlet end of the body, a second cylindrical passage portion leading out the outlet end of the body, and a frustoconical passage portion connecting said first and second cylindrical portions.

21. The valve of claim 20 wherein said housing comprises inner and outer tubes spaced radially apart from each other except for being joined together by a radial portion at one end of said housing, said central axial passage being in said inner tube.

22. The valve of claim 20 or 21 having a generally cylindrical non-ferromagnetic magnet holder having a hollow interior provided with means for holding said magnet axially of said holder while enabling fluid flow therearound, said holder having a cylindrical exterior portion with a portion fitting snugly into said first cylindrical portion of said body and means for adjusting the position of said holder relative to said body, thereby varying the force exerted by the magnet on said ball.

23. The valve of claim 22 wherein said holder has a radially outwardly extending flange engaging one end of said body.

24. The valve of claim 17 wherein said second seat is a frustoconical annulus around said needle-valve opening.

25. A pressure-actuated flow control valve comprising:
- a generally cylindrical housing with an inlet, an outlet, an axial passage between the inlet and the outlet, a first seat in the passage near the inlet, and a second seat in the passage spaced apart from the first seat and nearer the outlet, said housing comprising a generally cylindrical non-ferromagnetic tubular body having a central axial passage therethrough with a first cylindrical passage portion leading in from the inlet end of the body, a second cylindrical passage portion leading in from the outlet end of the body, a reduced-diameter third cylindrical passage portion between said first and second cylindrical passage portions, a first frustoconical passage portion connecting said first and third cylindrical portions, and a second frustoconical passage portion connecting said second and third cylindrical portions and serving as a first seat,
- a long and narrow permanent magnet located axially in said passage, between said inlet and said first seat,
- a ferromagnetic ball in between said seats urged by said magnet toward said first seat to check backflow,
- a generally cylindrical non-ferromagnetic magnet holder having a hollow interior provided with means for holding said magnet axially of said holder while enabling fluid flow therearound, said holder having a cylindrical exterior portion smaller in diameter than said first cylindrical portion of said body and fitting therewithin with clearance, and means for adjusting the position of said holder relative to said body thereby varying the force exerted by the magnet on said ball,
- said second seat controlling flow through the valve,
- said valve responding to pressure differential between the inlet and the outlet to move said ball away from said first seat and toward said second seat,
- the clearance around said ball in said passage increasing toward said second seat.

26. The valve of claim 25 wherein said holder has a frustoconical exterior portion at its end adjoining said cylindrical exterior portion, smaller in diameter than said first cylindrical portion of said body, and fitting therewithin with clearance.

27. The valve of claim 26 wherein said means for adjusting comprises interior threads at the inlet end of said body and mating exterior threads on said holder.

28. The valve of claim 26 wherein said magnet is a cylindrical rod and said means for holding said magnet comprise a set of three longitudinal vanes extending in from the hollow interior of said holders.

29. The valve of claim 26 wherein said magnet is a long bar that is square in cross-section and said means for holding said magnet comprise a set of four longitudinal vanes extending in from the hollow interior of said holder.

30. The valve of claim 25 having a screen between said inlet and said magnet.

31. A pressure-actuated flow control valve comprising:
 a generally cylindrical housing with an inlet, an outlet, an axial passage between the inlet and the outlet, a first seat in the passage near the inlet, and a second seat in the passage spaced apart from the first seat and nearer the outlet, said housing comprising a generally cylindrical non-ferromagnetic tubular body having a central axial passage therethrough with a first cylindrical passage portion leading in from the inlet end of the body, a second cylindrical passage portion leading out the outlet end of the body, and a frustoconical passage portion connecting said first and second cylindrical portions,
 said housing comprising inner and outer tubes spaced radially apart from each other except for being joined together by a radial portion at one end of said housing, said central axial passage being in said inner tube,
 a permanent magnet located axially in said passage, between said inlet and said first seat,
 a ferromagnetic ball in between said seats urged by said magnet toward said first seat to check backflow,
 a generally cylindrical non-ferromagnetic magnet holder having a hollow interior provided with means for holding said magnet axially of said holder while enabling fluid flow therearound, said holder having a cylindrical exterior portion with a portion fitting snugly into said first cylindrical portion of said body and means for adjusting the position of said holder relative to said body, thereby varying the force exerted by the magnet on said ball,
 said holder having a radially outwardly extending flange engaging the end of said inner tube only,
 said second seat controlling flow through the valve,
 said valve responding to pressure differential between the inlet and the outlet to move said ball away from said first seat and toward said second seat,
 the clearance around said ball in said passage increasing toward said second seat.

32. A pressure-actuated flow control valve comprising:
 a generally cylindrical housing with an inlet, an outlet, an axial passage between the inlet and the outlet, a first seat in the passage near the inlet, and a second seat in the passage spaced apart from the first seat and nearer the outlet, a generally cylindrical non-ferromagnetic tubular body having a central axis passage therethrough with a first cylindrical passage portion leading in from the inlet end of the body, a second cylindrical passage portion leading out the outlet end of the body, and a frustoconical passage portion connecting said first and second cylindrical portions, said housing comprising inner and outer tubes spaced radially apart from each other except for being joined together by a radial portion at one end of said housing, said central axial passage being in said inner tube,
 a permanent magnet located axially in said passage, between said inlet and said first seat,
 a ferromagnetic ball in between said seats urged by said magnet toward said first seat to check backflow,
 a generally cylindrical non-ferromagnetic magnet holder having a hollow interior provided with means for holding said magnet axially of said holder while enabling fluid flow therearound, said holder having a cylindrical exterior portion with a portion fitting snugly into said first cylindrical portion of said body and means for adjusting the position of said holder relative to said body, thereby varying the force exerted by the magnet on said ball, said magnet being a long bar that is square in cross-section and said means for holding said magnet comprising a set of four longitudinal vanes extending in from the hollow interior of said holder,
 said second seat controlling flow through the valve,
 said valve responding to pressure differential between the inlet and the outlet to move said ball away from said first seat and toward said second seat,
 the clearance around said ball in said passage increasing toward said second seat.

33. A pressure-actuated flow control valve comprising:
 a generally cylindrical housing with an inlet, an outlet, an axial passage between the inlet and the outlet, a first seat in the passage near the inlet, and a second seat in the passage spaced apart from the first seat and nearer the outlet, a generally cylindrical non-ferromagnetic tubular body having a central axial passage therethrough with a first cylindrical passage portion leading in from the inlet end of the body, a second cylindrical passage portion leading out the outlet end of the body, and a frustoconical passage portion connecting said first and second cylindrical portions,
 a permanent magnet located axially in said passage, between said inlet and said first seat,
 a ferromagnetic ball in between said seats urged by said magnet toward said first seat to check backflow,
 a generally cylindrical seat member adjustably threaded into the outlet end of said body to enable adjustment of the distance between said magnet and said second seat and providing said second seat and having an outlet end and a cylindrical bore from said second seat to said outlet end, said second seat controlling flow through the valve, said second seat including a radially extending slot joined to said bore and flat annular face against which said ball can abut,
 said valve responding to pressure differential between the inlet and the outlet to move said ball away from said first seat and toward said second seat, the clearance around said ball in said passage increasing toward said second seat.

34. The valve of claim wherein said housing comprises inner and outer tubes spaced radially apart from each other except for being joined together by a radial portion at one end of said housing, said central axial passage being in said inner tube.

35. The valve of claim 33 wherein said seat member has a radial flange from which projects a finger extending toward said inlet end, said body having an externally knurled flange and said finger having a rib engaging the knurls, so that when said seat member is threaded into or out from said body, said rib and knurls produce audible clicks indicating the degree of relative movement.

36. A pressure-actuated flow control valve comprising:
   a generally cylindrical housing body with an inlet, an outlet, an axial passage between the inlet and the outlet, a first seat in the passage near the inlet, and a generally cylindrical seat member adjustably threaded into the outlet end of said body and providing a second seat in the passage spaced apart from the first seat and nearer the outlet and having an outlet end with a cylindrical bore leading in therefrom to a shoulder, and an axial needle-valve opening joining said shoulder to said second seat,
   a permanent magnet located axially in said passage, between said inlet and said first seat,
   a ferromagnetic ball in between said seats urged by said magnet toward said first seat to check backflow,
   said second seat controlling flow through the valve,
   said valve responding to pressure differential between the inlet and the outlet to move said ball away from said first seat and toward said second seat,
   the clearance around said ball in said passage increasing toward said second seat,
   a hollow needle member having a generally cylindrical exterior fitting in and sealed to said bore of said seat member and threaded to said seat member for varying their relative positions and having a needle end facing said needle-valve opening, said needle member having radial passage means adjacent said needle end leading into a cylindrical bore of said needle member that provides said valve outlet,
   said seat member having a radial flange from which project two axially extending fingers,
   a first finger extending toward said inlet end, said body having an externally knurled flange and said finger having a rib engaging the knurls, so that when said seat member is threaded into or out from said body, said rib and knurls produce audible clicks indicating the degree of relative movement, and
   a second finger extending toward said outlet and having a rib thereon,
   said needle member having a knurled flange which is engaged by the rib of said second finger to produce clicks when there is relative rotation between said needle member and said seat member.

37. A pressure-actuated flow control valve comprising:
   a generally cylindrical housing body with an inlet, an outlet, an axial passage between the inlet and the outlet, a first seat in the passage near the inlet, and a generally cylindrical seat member adjustably threaded into the outlet end of said body and providing a second seat in the passage spaced apart from the first seat and nearer the outlet and having an outlet end with a cylindrical bore extending in and through said second seat,
   a permanent magnet located axially in said passage, between said inlet and said first seat,
   a ferromagnetic ball in between said seats urged by said magnet toward said first seat to check backflow,
   said second seat controlling flow through the valve,
   said valve responding to pressure differential between the inlet and the outlet to move said ball away from said first seat and toward said second seat,
   the clearance around said ball in said passage increasing toward second seat.

38. The valve of claim 37 wherein said seat member has a radial outwardly extending flange from which projects a finger extending axially toward said inlet, said body having an externally knurled flange and said finger having a rib engaging the knurls and producing audible clicks upon relative rotation to thread said seat member into and out from said body.

39. The valve of claim 38 wherein said second seat is a flat annular face with radial notches therein.

40. A pressure-actuated flow control valve comprising:
   a generally cylindrical housing with an inlet, an outlet, an axial passage between the inlet and the outlet, a first seat in the passage near the inlet, and a second seat in the passage spaced apart from the first seat and nearer the outlet, a generally cylindrical non-ferromagnetic tubular body having a central axial passage therethrough with a first cylindrical passage portion leading in from the inlet end of the body, a second cylindrical passage portion leading out the outlet end of the body, and a frusto-conical passage portion connecting said first and second cylindrical portions,
   a permanent magnet located axially in said passage, between said inlet and said first seat,
   a ferromagnetic ball in between said seats urged by said magnet toward said first seat to check backflow,
   a generally cylindrical non-ferromagnetic magnet holder having a hollow interior provided with means for holding said magnet axially of said holder while enabling fluid flow therearound, said holder having a cylindrical exterior portion with a portion fitting snugly into said first cylindrical portion of said body and means for adjusting the position of said holder relative to said body, thereby varying the force exerted by the magnet on said ball,
   said magnet being a long bar that is square in cross-section and said means for holding said magnet comprising a set of four longitudinal vanes extending in from the hollow interior of said holder.
   said second seat controlling flow through the valve,
   said valve responding to pressure differential between the inlet and the outlet to move said ball away from said first seat and toward said second seat,
   the clearance around said ball in said passage increasing toward said second seat.

41. The valve of claim 40 wherein said seat member has a radial flange from which projects a finger extending toward said inlet end, said body having an externally knurled flange and said finger having a rib engaging the knurls, so that when said seat member is threaded into or out from said body, said rib and knurls produce audible clicks indicating the degree of relative movement.

42. The valve of claim 41 wherein said body's flange is on said outer tube.

* * * * *

UNITED STATES PATENT AND TRADEMARK OFFICE
CERTIFICATE OF CORRECTION

PATENT NO. : 4,465,095
DATED : August 14, 1984
INVENTOR(S) : John E. Lindberg

It is certified that error appears in the above–identified patent and that said Letters Patent are hereby corrected as shown below:

Column 4, line 48, "the" should read --that--.
Column 8, line 40, "clocks" should read --clicks--.
Column 10, line 38, "supplied" should read --applied--.
Column 11, line 40, "3/16' " should read --3/16" --.
Column 15, line 20, before "FIGS." insert -- ( --.
Column 15, line 53, "gradually" should read --generally--.
column 15, line 58, "formed" should read --forced--.
Column 16, line 55, after "claim 9" insert --or claim 13--.
Column 17, line 64, "pressure portion" should read
                                         --passage portion--.
Column 19, line 67, "axis" should read --axial--.
Column 21, line 3, after "claim" insert --33--.
Column 22, line 17, before "second" insert --said--.

Signed and Sealed this

Fifth Day of March 1985

[SEAL]

Attest:

DONALD J. QUIGG

Attesting Officer  Acting Commissioner of Patents and Trademarks